No. 757,561. PATENTED APR. 19, 1904.
C. R. MOON.
CHUCK.
APPLICATION FILED JULY 6, 1903.
NO MODEL. 2 SHEETS—SHEET 1.
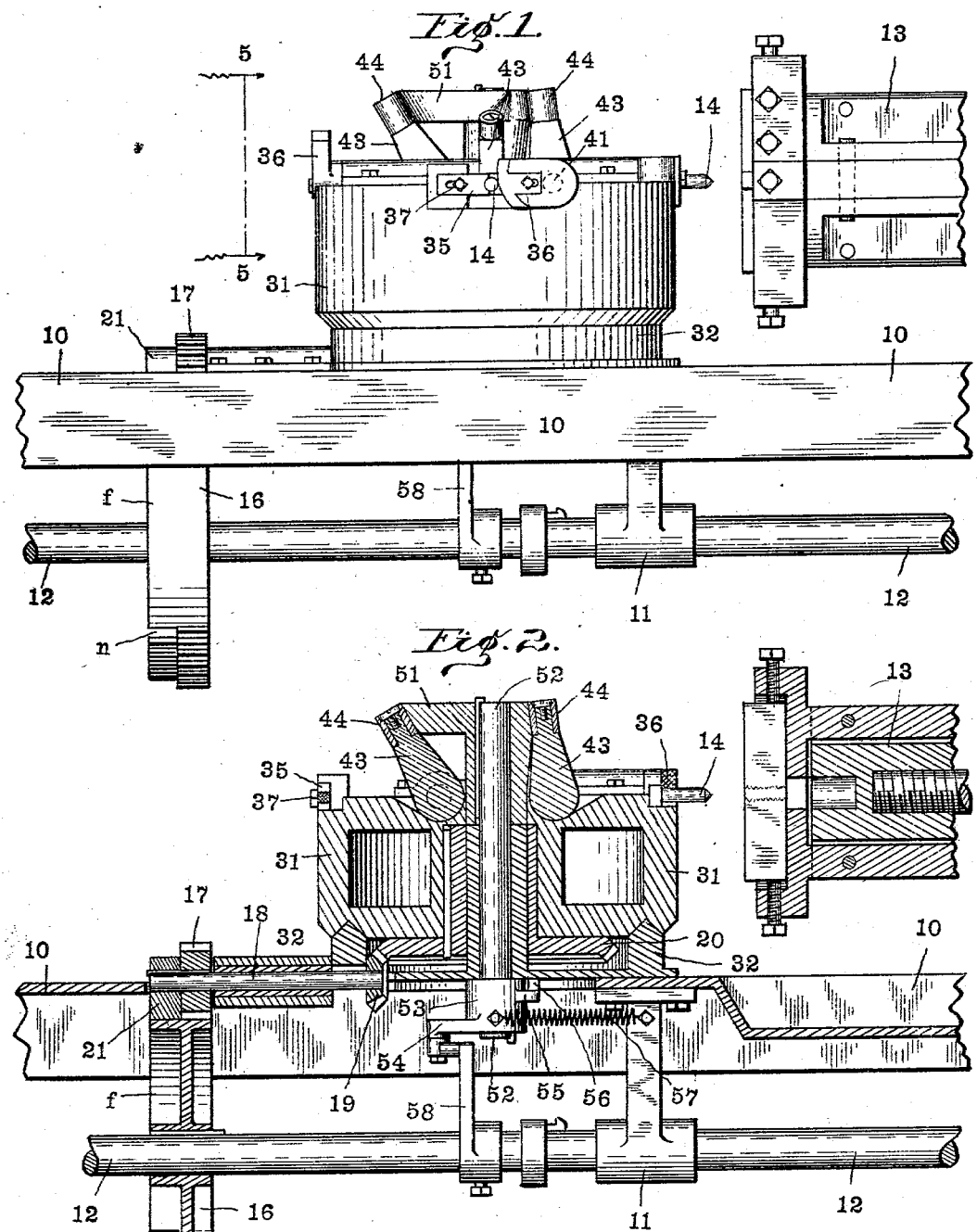
Witnesses
Frank A. Fahle
J. A. Walsh
Inventor
Charles R. Moon
By Bradford & Hood,
Attorneys No. 757,561. PATENTED APR. 19, 1904.
C. R. MOON.
CHUCK.
APPLICATION FILED JULY 6, 1903.
NO MODEL. 2 SHEETS—SHEET 2.

Witnesses
Frank A. Fahle
J. A. Walsh

Inventor
Charles R. Moon
By Bradford V. Hood,
Attorney

No. 757,561.

Patented April 19, 1904.

UNITED STATES PATENT OFFICE.

CHARLES R. MOON, OF MUNCIE, INDIANA.

CHUCK.

SPECIFICATION forming part of Letters Patent No. 757,561, dated April 19, 1904.

Application filed July 6, 1903. Serial No. 164,317. (No model.)

*To all whom it may concern:*

Be it known that I, CHARLES R. MOON, a citizen of the United States, residing at Muncie, in the county of Delaware and State of Indiana, have invented certain new and useful Improvements in Chucks, of which the following is a specification.

The object of my invention is to provide a simple and efficient automatically-operating chuck of a suitable character to be used with machines in which successive automatically-performed operations are required upon the articles being made or finished by such machines. For convenience I will show and describe my said chuck as used in connection with a machine for threading bolts, such as forms the subject-matter of my companion application Serial No. 163,929, wherein its relation to such a machine (for the purpose indicated) may be observed; but I do not desire to be limited to said machine or to any particular use of said invention, but expect to use the same in any situation or with any machine to which it is applicable.

Figure 3:
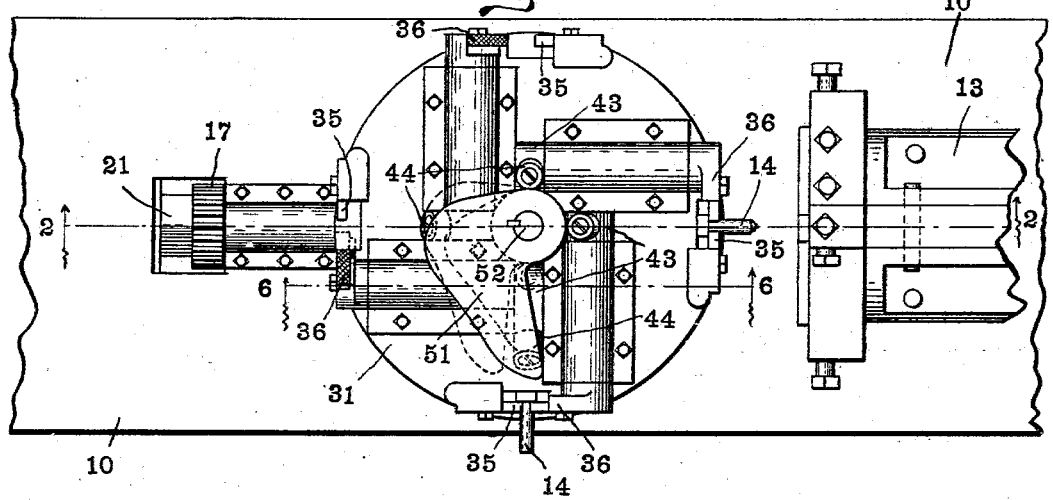
Figure 4:
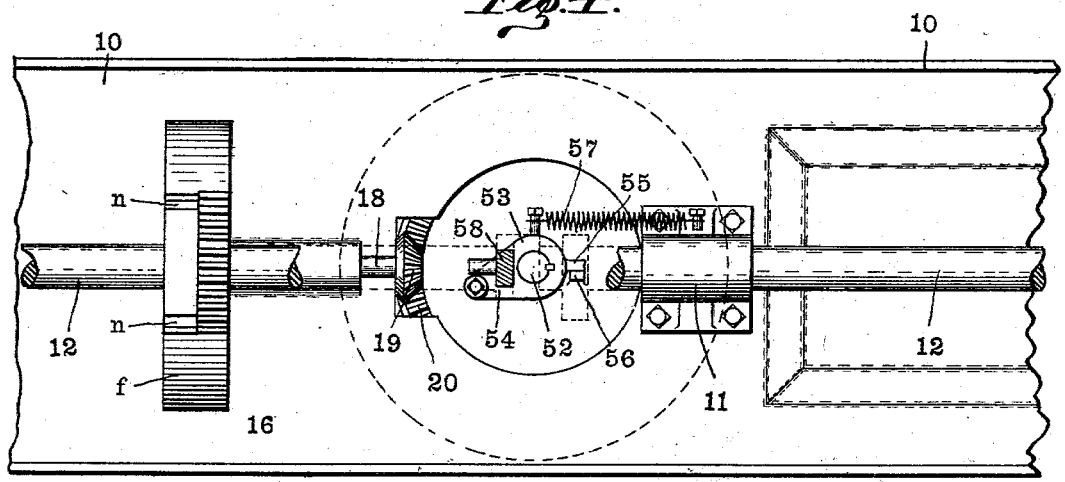
Figure 5:
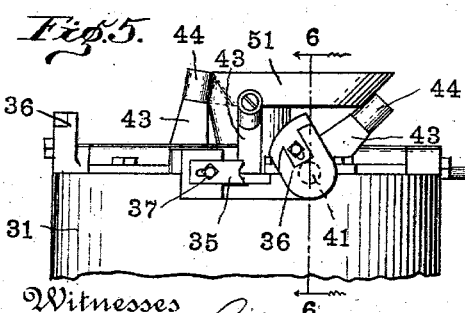

Referring to the accompanying drawings, which are made a part hereof, and in which similar reference characters indicate similar parts, Figure 1 is a side elevation of a chuck and immediately adjacent machine parts, illustrating my said invention and its use; Fig. 2, a central vertical sectional view thereof as seen when looking in the direction indicated by the arrows from the dotted line 2 2 in Fig. 3; Fig. 3, a top or plan view of the same; Fig. 4, an under side plan view with a portion of the shaft below the chuck broken away in order to show the bottom of the chuck mechanism more plainly, the position of the broken-away parts being, however, indicated by means of dotted lines; Fig. 5, an elevation of the upper portion of the chuck as seen from the dotted line 5 5 alongside Fig. 1, and Fig. 6 a detail sectional view as seen when looking in the direction indicated by the arrows from the dotted line 6 6 in Fig. 3.

As before stated, my improved chuck is shown in connection with a machine with which it may appropriately be used, so that its complete use and operation is illustrated, and is shown as mounted upon the bed-plate 10 of such a machine, below which in suitable bearings, as 11, a shaft 12 is mounted. This shaft should be connected with the other mechanism of the machine with which the chuck is designed to operate, so that the several operations shall be performed in the required relation to each other. In the present instance I have illustrated a bolt-threading head 13 as the device with which the chuck is to operate and have illustrated a bolt 14 as held by the jaws of the chuck ready to be operated upon by the bolt-threading head. Upon the shaft 12 is a mutilated gear 16, which engages with and drives a pinion 17, which in turn drives the shaft 18, carrying the bevel-pinion 19, which engages with and drives the bevel-pinion 20, which is rigidly connected to and rotates my improved chuck. This rotating of the chuck is of an intermitting character, and precise accuracy thereof is secured by the detent 21, which is secured on the shaft 18 alongside the pinion 17 and bears upon the flange $f$ of the mutilated gear 16 and operates in notches $n$ therein at proper times, all as more fully described in my application Serial No. 163,929 referred to.

My improved chuck consists of a body 31, which is mounted upon a circular track 32 and is adapted to be rotated intermittingly by the means just described. It is provided with a multiplicity of sets of jaws, each set consisting of a stationary jaw 35 and a rocking jaw 36. The stationary jaw is provided with such a face as is suitable to the work to be held by the chuck. In the present case the chuck being designed for holding bolts the jaw-face is provided with a semicircular notch of a size to receive the body of the bolt being operated upon, preferably at a point just below its head, the position of the bolt therein being best illustrated in Figs. 2 and 3, while the shape of the jaw-face is best shown in Fig. 1. As shown in Fig. 2, there is preferably a shoulder in the body of the chuck just behind the jaws, against which the head of the bolt will come and which will receive the thrust which may be occasioned by the work. That part of the jaw 35 which comes in immediate contact with the work is secured to its supporting part or base by a bolt or screw 37 and is thus removable and adjustable. By having a series of these removable jaw parts with faces of different shapes the chuck is capable of being changed to fit different sizes and styles of work by simply changing the jaws to correspond.

Figure 6:
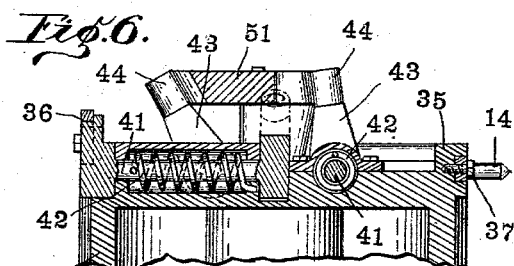

The jaw 36 is mounted on a rock-shaft 41, which, as best shown in Fig. 6, is normally held down, so as to bring said jaw 36 into operative relation with the jaw 35, by means of a coiled spring 42, one end of which is connected to said rock-shaft and the other end of which is connected to the adjacent portion of the body of the chuck and which is so arranged as to exert its force to hold the chuck-jaws closed. Upon the inner end of each of the rock-shafts 41 is an arm 43, the upper end of which extends into the path of a cam 51, which is mounted on a vertical shaft 52, extending vertically through the center of the chuck. The upper ends of the lever-arms 43 are preferably provided with antifriction-sleeves 44, which provide contact-surfaces against which the cam 51 will immediately bear for the well-known purposes of reducing friction and wear. Upon the lower end of shaft 52 is a hub 53, which is also mounted rigidly thereon, and this hub is provided with arms 54 and 55, the latter of which engages with a fixed stop 56, extending down into the path of said arm from an adjacent rigid portion of the structure, whereby the rotation of the shaft in that direction is limited. The tension-spring 57 is also connected to one side of the hub 53 and to an adjacent fixed part of the structure, which spring normally holds the arm 55 back into contact with the stop 56. Upon the shaft 12 is an arm 58, which as said shaft rotates is adapted to come in contact with the arm 54, and thus rotate the shaft 52 oppositely to the pull of the spring 57 for a short distance. When this occurs, the cam 51 will be quickly moved from the position indicated by the full lines in Fig. 3 to the position indicated by the dotted lines therein, which will permit the particular arm 43 which is at the time being held over by said cam to escape therefrom and fly back to a position near the hub of the cam. The bolt or other article has at a time just preceding this operation been introduced into the chuck to a position alongside the jaw 35 ready to be gripped, and the spring 42 (acting through the rock-shaft 41) impels the jaw 36 into forcible gripping contact therewith. As will be readily understood, the movement of the shaft 52 and the cam by reason of the arm 58 coming in contact with the arm 54 is but momentary, as the shaft 12 quickly carries the arm 58 out of contact with said arm 54, whereupon the spring 57 restores the parts in question to their normal position.

The operation of my improved chuck may be briefly recapitulated, as follows: In the construction shown the article to be held by the chuck is introduced therein at the point where the parts are in the position indicated at the left hand in Figs. 1, 2, and 3 and in front in Fig. 5. At this instant the operation occasioned by the contact of the arm 58 with the arm 54 takes place, and the chuck-jaws are thereby closed upon the article. The cam shape of the jaw 36 causes the grip to be a very strong one and one which increases in force as greater force is being put upon the article being operated upon. As the chuck-body is rotated the sets of chuck-jaws pass the operating point or points successively, which may be understood to be in front of and at the right of the positions shown in the principal figures of drawings, and pauses at the time the articles held thereby are opposite such operating point or points, and during these pauses such operations are performed as are desired. When the jaws have reached the position to the rear of the chuck, as illustrated in these views, (or the upper side as shown in Fig. 3,) the arm 43 comes in contact with the cam 51, and the chuck-jaws are thus opened and the article which has been operated upon is discharged. As the chuck-body revolves these operations are continuously repeated.

Having thus fully described my said invention, what I claim as new, and desire to secure by Letters Patent, is—

1. The combination of a multiplicity of sets of coacting chuck-jaws, a revoluble structure carrying said jaws, a rock-shaft for one jaw of each set, an arm connected to each rock-shaft, an independently-movable shaft centrally located with respect to said revoluble structure, a cam, carried by said shaft, into the path of which said arms extend, means for revolving the chuck structure about the cam, and means for independently moving the shaft, whereby the jaws are closed after the article to be held thereby is introduced and automatically opened after the required operation has been performed.

2. The combination of a revoluble chuck-head, means for intermittently moving the same, a multiplicity of sets of coacting chuck-jaws mounted on said head, one jaw of each set being movable, a cam, intermediate connections between said cam and all of the movable chuck-jaws, and means for independently moving the cam.

3. The combination, in a chuck-head, of a stationary jaw, a movable jaw, a rock-shaft on which said movable jaw is mounted, a spring surrounding said rock-shaft by which the jaw is normally held closed, an arm extending out from said rock-shaft by means of which said jaw may be opened, means for revolving the chuck-head, and means for automatically operating said arm as the chuck-head revolves.

4. The combination of, a rotary chuck-head, a multiplicity of sets of chuck-jaws mounted thereon, rock-shafts upon which the movable chuck-jaws are mounted, arms carried by said rock-shafts, an independently-movable central shaft, a cam mounted thereon extending into the paths of said arms, a stop on an adjacent rigid portion of the structure, an arm carried by the cam-shaft, means for normally holding said arm against said stop, a second arm carried by said cam-shaft and a moving part adapted to intermittently come in contact with said last-named arm and thus move said cam-shaft and cam a short distance in opposition to the tension of the means by which the first-mentioned arm on said shaft is normally held against the stop, and then to escape therefrom.

5. The combination of a rotary chuck-head, a multiplicity of sets of jaw thereon, one jaw of each of said sets being mounted on a rock-shaft, said rock-shafts, arms thereon for operating the same, springs connected to said rock-shafts whereby the chuck-jaws carried thereby are normally held closed, a central shaft extending through said chuck-head and bearing a cam upon its outer end adapted to come in contact with the arms on the rock-shaft and operate the same to open the jaws carried thereby, means whereby the chuck-head is intermittingly moved, and means for slightly moving the cam-shaft and thus carrying the cam out of engagement with one of the arms on the chuck-jaw-carrying rock-shaft, at a time when the chuck-head is at rest and said jaws have just received an article to be operated upon, thereby permitting the chuck-jaw to grip said article.

6. The combination of, a rotatable chuck-head, a stationary jaw carried thereby, a rock-shaft positioned adjacent said stationary jaw, a coöperating jaw carried by said rock-shaft having a cam-face, means whereby said rock-shaft is actuated to hold said jaws closed, an arm on said rock-shaft, an independently-movable shaft centrally located with respect to the chuck-head, and means carried by said shaft for operating said arm independently of the rotation of the chuck-head.

In witness whereof I have hereunto set my hand and seal, at Muncie, Indiana, this 2d day of July, A. D. 1903.

CHARLES R. MOON. [L. S.]

Witnesses:
CLEMENT H. WINCHESTER,
HARRY N. HUFF.